(12) United States Patent
Usui et al.

(10) Patent No.: US 11,956,395 B2
(45) Date of Patent: Apr. 9, 2024

(54) IMAGE-FORMING APPARATUS, PRINT MANAGEMENT SYSTEM, AND METHOD FOR CONTROLLING IMAGE-FORMING APPARATUS

(71) Applicant: SHARP KABUSHIKI KAISHA, Sakai (JP)

(72) Inventors: Takashi Usui, Sakai (JP); Tomoki Minamikawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/119,634

(22) Filed: Mar. 9, 2023

(65) Prior Publication Data
US 2023/0291853 A1 Sep. 14, 2023

(30) Foreign Application Priority Data
Mar. 10, 2022 (JP) ................. 2022-036718

(51) Int. Cl.
*H04N 1/00* (2006.01)
*H04N 1/32* (2006.01)
*H04N 1/60* (2006.01)

(52) U.S. Cl.
CPC ..... *H04N 1/00819* (2013.01); *H04N 1/32101* (2013.01); *H04N 1/6008* (2013.01); *H04N 1/6033* (2013.01)

(58) Field of Classification Search
CPC .......... H04N 1/00819; H04N 1/32101; H04N 1/6008; H04N 1/6033
USPC .................................................. 358/1.9, 1.15
See application file for complete search history.

(56) References Cited

U.S. PATENT DOCUMENTS

2010/0088609 A1\* 4/2010 Kawana ............... G03G 15/502
                                                                    715/740
2018/0367703 A1\* 12/2018 Wagatsuma ......... H04N 1/6033

FOREIGN PATENT DOCUMENTS

JP          2019-061016 A       4/2019

\* cited by examiner

*Primary Examiner* — Quang N Vo
(74) *Attorney, Agent, or Firm* — ScienBiziP, P.C.

(57) ABSTRACT

An image-forming apparatus includes a detachable consumable; a printer that prints an image using the consumable; and a controller that determines whether control information that is set for the consumable and that is for control of the printer exists. The controller extracts, when it is determined that the control information corresponding to the consumable does not exist, image information from an image of a predetermined test pattern printed by the printer, and acquires the control information generated based on the extracted image information.

11 Claims, 8 Drawing Sheets

IMAGE-FORMING APPARATUS, PRINT MANAGEMENT SYSTEM, AND METHOD FOR CONTROLLING IMAGE-FORMING APPARATUS

CROSS-REFERENCE TO RELATED APPLICATION

The present application claims priority from Japanese Application JP2022-036718, the content of which is hereby incorporated by reference into this application.

BACKGROUND

The present disclosure relates to an image-forming apparatus, a print management system, and a method for controlling the image-forming apparatus.

In the related art, an image-forming apparatus is proposed that acquires identification information of consumables, transmits the identification information to a server apparatus, and receives from the server apparatus an image-forming condition for controlling an image former.

SUMMARY

However, in the related art described above, when a consumable having identification information that may not be recognized by the server apparatus is installed, the image-forming apparatus may not acquire control information for the consumable.

An aspect of the present disclosure is to propose an image-forming apparatus that can acquire appropriate control information corresponding to consumables.

According to an aspect of the present disclosure, an image-forming apparatus includes a detachable consumable, a printer that prints an image using the consumable, and a controller that determines whether control information that is set for the consumable and that is for control of the printer exists. The controller extracts, when it is determined that the control information corresponding to the consumable does not exist, image information from an image of a predetermined test pattern printed by the printer, and acquires the control information generated based on the extracted image information.

According to another aspect of the present disclosure, a print management system includes an image-forming apparatus including a detachable consumable, a printer that prints an image using the consumable, and a controller that determines whether control information that is set for the consumable and that is for control of the printer exists, extracts, when it is determined that the control information corresponding to the consumable does not exist, image information from an image of a predetermined test pattern printed by the printer, and acquires the control information generated based on the extracted image information, and a management server that generates the control information based on the image information extracted by the image-forming apparatus.

According to a further aspect of the present disclosure, a method for controlling an image-forming apparatus that includes a printer that prints an image using a detachable consumable includes determining whether control information that is set for the consumable and that is for control of the printer exists, extracting, when it is determined that the control information corresponding to the consumable does not exist, image information from an image of a predetermined test pattern printed by the printer, and acquiring the control information generated based on the extracted image information.

Accordingly, the image-forming apparatus can acquire appropriate control information corresponding to a consumable as an effect.

DETAILED DESCRIPTION

Hereinafter, an embodiment and modifications of the present disclosure will be described with reference to the accompanying drawings. Hereinafter, the same reference signs are given to the same or equivalent components throughout all the drawings, and their duplicate descriptions are to be omitted. The embodiment and modifications described below are merely examples of the present disclosure, and the present disclosure is not limited to the embodiment and modifications. Other than the embodiment and the modifications, various changes may be made according to the design, etc., without departing from the technical concept of the present disclosure.

Print Management System

Figure 1:
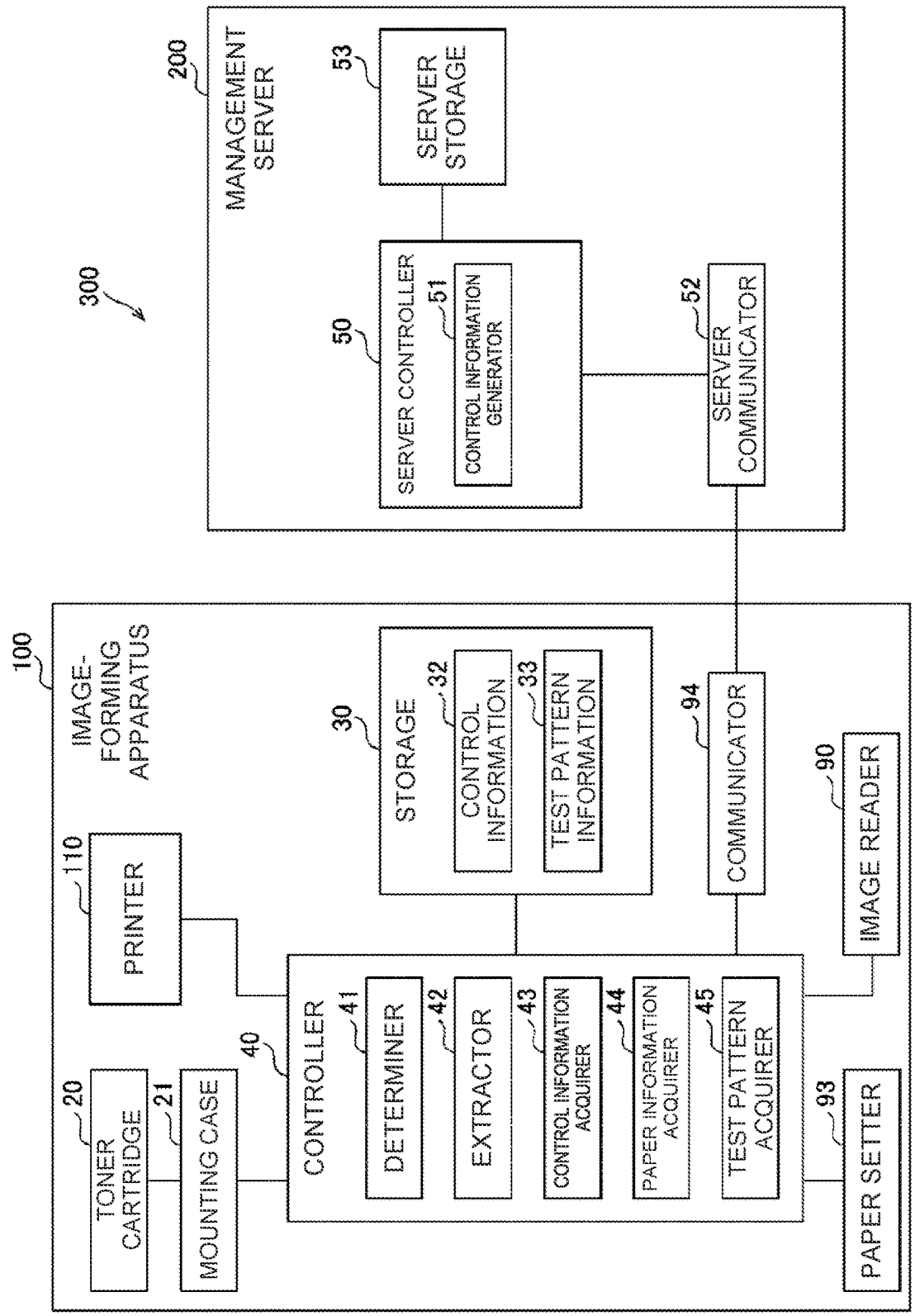
FIG. 1 is a block diagram illustrating a configuration of an important portion of a print management system according to an embodiment of the present disclosure.
Figure 2:
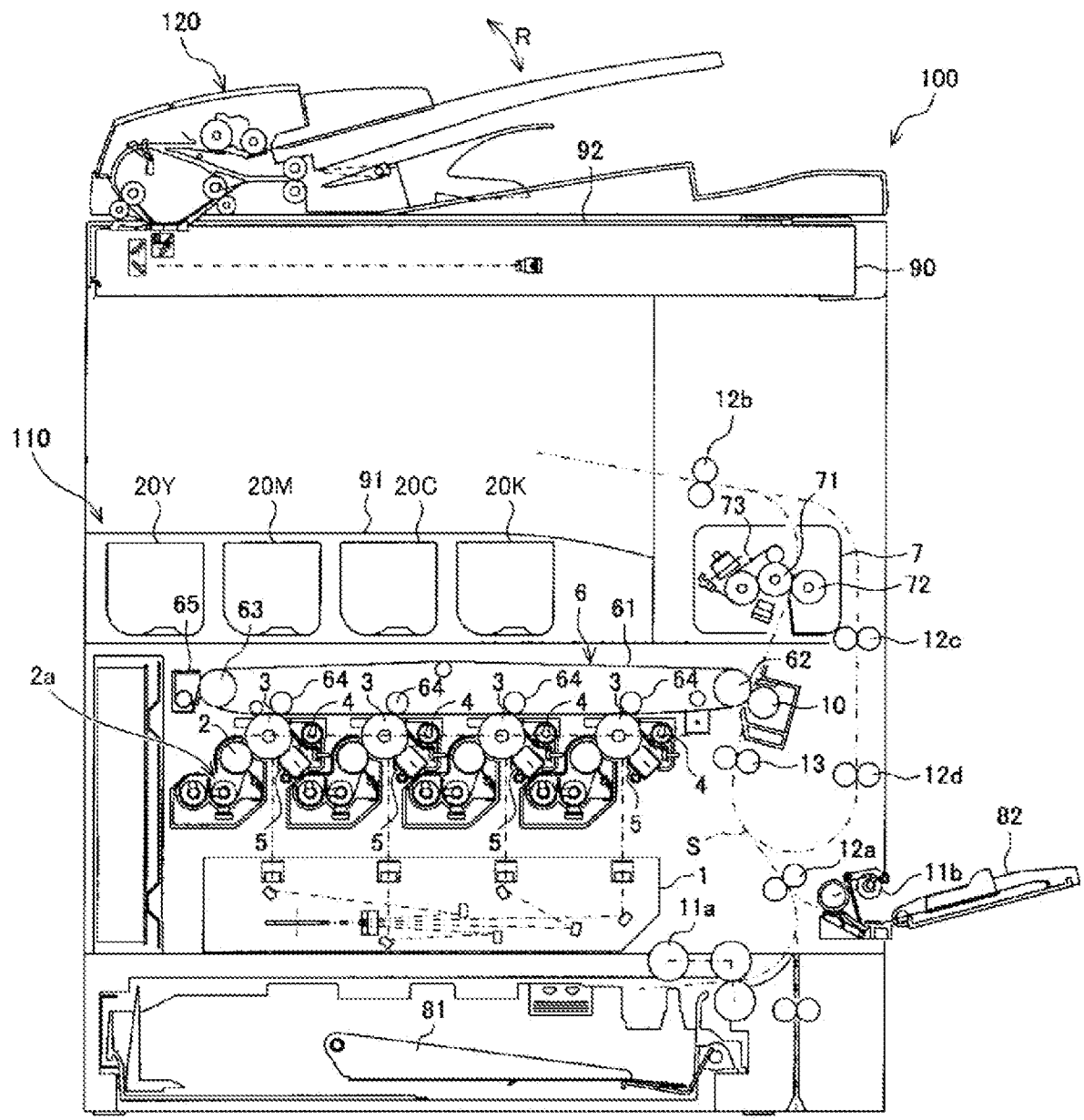
FIG. 2 is a diagram schematically illustrating an example of an internal structure of an image-forming apparatus included in the print management system shown in FIG. 1.

A print management system 300 according to the embodiment of the present disclosure will be described with reference to FIGS. 1 and 2. FIG. 1 is a block diagram illustrating a configuration of an important portion of the print management system 300 according to the embodiment of the present disclosure. FIG. 2 is a diagram schematically illustrating an example of an internal structure of an image-forming apparatus 100 included in the print management system 300 shown in FIG. 1.

The print management system 300 according to the embodiment of the present disclosure includes an image-forming apparatus 100 and a management server 200 connected to the image-forming apparatus 100 via a network in a communicable manner as illustrated in FIG. 1. Although one image-forming apparatus 100 is connected to the management server 200 in FIG. 1 for convenience of explanation, a plurality of image-forming apparatuses 100 may be provided.

Image-Forming Apparatus

The image-forming apparatus 100 is a laser color printer that forms multicolor and monochromatic images on a sheet for image formation. The image-forming apparatus 100 prints an image on a sheet based on image data read from a document by an image reader 90 or image data received from an external source. Note that, although the laser color printer is taken as an example of the image-forming apparatus 100 in this embodiment, the present disclosure is not limited to this. For example, the image-forming apparatus 100 may be an ink jet printer.

As shown in FIG. 2, the image-forming apparatus 100 includes a printer 110, an image reader 90, a document laying table 92, and an automatic document processor 120. The printer 110 includes an exposure unit 1, developers 2, photoreceptor drums 3, cleaner units 4, chargers 5, an intermediate transfer belt unit 6, a fusing unit 7, a paper feeding cassette 81, and a manual paper feeding cassette 82.

The image reader 90 and the document laying table 92 made of transparent glass are disposed on the printer 110. Furthermore, the automatic document processor 120 is installed on the document laying table 92.

The automatic document processor 120 automatically transports a document onto the document laying table 92. The automatic document processor 120 is configured to be turned in a direction of an arrow R. A document may be placed on the document laying table 92 after a top of the document laying table 92 is opened.

The image reader 90 reads image data from a document that is transported or placed on the document laying table 92. The printer 110 prints an image on a sheet based on the image data read by the image reader 90.

The image data handled by the image-forming apparatus 100 is for color images of black (K), cyan (C), magenta (M), and yellow (Y) colors. Accordingly, the developers 2, the photoreceptor drums 3, the cleaner units 4, and the chargers 5 are individually set to form four types of latent image for the individual colors.

The chargers 5 uniformly charge surfaces of the corresponding photoreceptor drums 3 to a predetermined potential. The chargers 5 may be charger type, contact type, or brush type chargers.

The exposure unit 1 is configured as a laser scanning unit (LSU) having a laser emitter, a reflecting mirror, and the like. The exposure unit 1 includes polygon mirrors for performing scanning with a laser beam and optical components, such as lenses or mirrors, for guiding the laser beam reflected by the polygon mirrors to the photoreceptor drums 3. The exposure unit 1 exposes the charged photoreceptor drums 3 in accordance with image data to form on surfaces of the photoreceptor drums 3 electrostatic latent images corresponding to the image data.

The developers 2 visualize the electrostatic latent images, which are formed on the photoreceptor drums 3, using toner. The developers 2 include respective developer tanks 2a which contain the toner. The developers 2 supply the toner contained in the developer tanks 2a to the photoreceptor drums 3. Furthermore, the developer tanks 2a are connected to corresponding toner cartridges 20 (consumables) that contain the toner via toner supply pipes not shown. The toner cartridges 20 are provided for the respective four colors of toner.

The cleaner units 4 remove residual toner remaining on the surfaces of the photoreceptor drums 3 after development and image transfer.

The intermediate transfer belt unit 6 is disposed over the photoreceptor drums 3. The intermediate transfer belt unit 6 includes an intermediate transfer belt 61, an intermediate transfer belt drive roller 62, an intermediate transfer belt driven roller 63, a plurality of intermediate transfer rollers 64, and an intermediate transfer belt cleaning unit 65. The four intermediate transfer rollers 64 are provided corresponding to the respective colors of C, M, Y, and K.

The intermediate transfer belt drive roller 62, the intermediate transfer belt driven roller 63, and the four intermediate transfer rollers 64 stretch and drive the intermediate transfer belt 61 in a rotatable manner. Furthermore, the intermediate transfer rollers 64 apply transfer bias so as to transfer toner images of the photoreceptor drums 3 on the intermediate transfer belt 61.

The intermediate transfer belt 61 is in contact with the photoreceptor drums 3. The toner images of the individual colors formed on the photoreceptor drums 3 are successively transferred on the intermediate transfer belt 61 in a superposing manner so that a color toner image (a multicolor toner image) is formed on the intermediate transfer belt 61. The intermediate transfer belt 61 is formed in an endless shape using a film having a thickness of, for example, approximately 100 μm to approximately 150 μm.

The transfer of the toner images from the photoreceptor drums 3 to the intermediate transfer belt 61 is performed by the intermediate transfer rollers 64 which are in contact with a back side of the intermediate transfer belt 61. A high-voltage transfer bias (a high voltage having an opposite polarity (+) to a charge polarity of the toner (−)) for transferring the toner images is applied to the intermediate transfer rollers 64. The intermediate transfer rollers 64 are formed based on a metal (e.g. stainless steel) shaft with a diameter of 8 to 10 mm, and surfaces thereof are covered with conductive elastic material (such as EPDM or urethane foam). The conductive elastic material can uniformly apply high voltage to the intermediate transfer belt 61.

The electrostatic latent images developed on the individual photoreceptor drums 3 according to respective color phases are superposed on the intermediate transfer belt 61 and transferred onto a sheet by the transfer roller 10 disposed at a contact position between the sheet and the intermediate transfer belt 61.

In this case, the intermediate transfer belt 61 and the transfer roller 10 are pressed against each other at a predetermined nip, and in addition, a voltage is applied to the transfer roller 10 in order to transfer the toner to the sheet (a high voltage of an opposite polarity (+) to a charging polarity (−) of the toner).

Furthermore, the toner attached to the intermediate transfer belt 61 when the intermediate transfer belt 61 is in contact with the photoreceptor drums 3 or the toner remaining on the intermediate transfer belt 61 since transfer is not performed on the sheet by the transfer roller 10 is removed and collected by the intermediate transfer belt cleaning unit 65 since such toner causes mixture of the colors of the toner in a subsequent step.

The intermediate transfer belt cleaning unit 65 includes a cleaning blade, as a cleaning member, for example, that makes contact with the intermediate transfer belt 61. Note that a surface of the intermediate transfer belt 61 that is opposite to a surface that is in contact with the cleaning blade is supported by the intermediate transfer belt driven roller 63.

The paper feeding cassette 81 is a tray for storing sheets to be used in image formation, and disposed on a lower side of the exposure unit 1 of the printer 110. The manual paper feeding cassette 82 is disposed on a side of the printer 110. In the image-forming apparatus 100, sheets may also be manually loaded into the manual paper feeding cassette 82.

The printer 110 further includes a paper discharge tray 91. The paper discharge tray 91 accumulates printed sheets in a face-down manner.

Furthermore, the printer 110 includes a paper transport path S for transporting sheets on the paper feeding cassette 81 and the manual paper feeding cassette 82 to the paper discharge tray 91 through the transfer roller 10 and the fusing unit 7. Pickup rollers 11a and 11b, a plurality of transport rollers 12a to 12d, a resist roller 13, the transfer roller 10, the fusing unit 7, and the like are arranged along the paper transport path S from the paper feeding cassette 81 or the manual paper feeding cassette 82 to the paper discharge tray 91.

The transport rollers 12a to 12d are small rollers for assisting the transport of sheets, and are disposed along the paper transport path S. The pickup roller 11a is disposed in the vicinity of an end of the paper feeding cassette 81, picks up the sheets one by one from the paper feeding cassette 81, and supplies the sheets one by one to the paper transport path S. Similarly, the pickup roller 11b is disposed in the vicinity of an end of the manual paper feeding cassette 82, picks up the sheets one by one from the manual paper feeding cassette 82, and supplies the sheets one by one to the paper transport path S.

The resist roller 13 temporarily holds a sheet being transported in the paper transport path S. The resist roller 13 transports a sheet to the transfer roller 10 at a timing when a tip end of a toner image on the intermediate transfer belt 61 is aligned with a tip end of the sheet.

The fusing unit 7 includes a heat roller 71 and a pressure roller 72, and the heat roller 71 and the pressure roller 72 rotate with a sheet interposed therebetween. The heat roller 71 is set to a predetermined fusing temperature based on a signal supplied from a temperature detector not shown. The heat roller 71, together with the pressure roller 72, then thermally compresses the toner onto the sheet. By this, the fusing unit 7 can melt, mix, and press-weld the multicolor toner image transferred to the sheet and thermally fix the toner image to the sheet. Note that the fusing unit 7 includes an external heating belt 73 for externally heating the heat roller 71.

In the image-forming apparatus 100 having the above configuration, the printer 110 performs printing on a sheet as follows when acquiring image data. That is, the printer 110, for example, leads each of sheets mounted on the paper feeding cassette 81 to the paper transport path S one by one using the pickup roller 11a and transports the sheet to the resist roller 13 using the transport roller 12a. Then the resist roller 13 transports the sheet to the transfer roller 10 at a timing when a tip end of the sheet and a tip end of the toner image on the intermediate transfer belt 61 are aligned with each other, and the toner image is transferred on the sheet. The toner image is then thermally fused on the sheet as the sheet passes the fusing unit 7, and the sheet is discharged through the transport roller 12b to the paper discharge tray 91.

Here, in the image-forming apparatus 100 of the embodiment of the present disclosure, the toner cartridge 20 can be an example of a consumable detachable from the image-forming apparatus 100.

When a toner cartridge 20 after replacement is the same product as a toner cartridge 20 before replacement, the printer 110 in the image-forming apparatus 100 can perform printing using the control information 32, such as image processing parameters that are set according to the toner cartridge 20 before replacement as is. When the toner cartridge 20 after replacement is a product provided by a manufacturer of the image-forming apparatus 100 and has been redesigned from the toner cartridge 20 before replacement due to a running change, an inquiry of control information for the toner cartridge 20 after replacement is issued to the manufacturer of the image-forming apparatus 100 so that the control information is acquired.

However, when the toner cartridge 20 after replacement is not provided by the manufacturer of the image-forming apparatus 100, the image-forming apparatus 100 may not acquire control information corresponding to the toner cartridge 20 after replacement and thus may not perform printing properly.

Therefore, the image-forming apparatus 100 of the embodiment of the present disclosure can obtain the control information 32 corresponding to the toner cartridge 20 after replacement, even when the image-forming apparatus 100 does not have the control information 32 corresponding to the toner cartridge 20 after replacement. In the following, taking the toner cartridge 20 as a consumable as an example, a configuration related to a process of acquiring the control information 32 according to the toner cartridge 20 will be described with reference to FIG. 1.

As illustrated in FIG. 1, the image-forming apparatus 100 includes a mounting case 21, a paper setter 93, a communicator 94, a storage 30, and a controller 40 in addition to the printer 110 and the image reader 90 described above.

The mounting case 21 is a storage container that accommodates the toner cartridge 20. The toner cartridge 20 is detachable from the mounting case 21. The mounting case 21 has an opening for inserting and withdrawing the toner cartridge 20.

To install the toner cartridge 20 into the image-forming apparatus 100, the user inserts and pushes the toner cartridge 20 into the opening of the mounting case 21. Furthermore, to remove the toner cartridge 20, the user pulls out the toner cartridge 20 accommodated in the mounting case 21 through the opening of the mounting case 21.

When the toner cartridge 20 is installed in the mounting case 21, a nonvolatile memory, not illustrated, disposed in the toner cartridge 20 is electrically connected to the image-forming apparatus 100. The controller 40 then reads an identification number of the toner cartridge 20 from the nonvolatile memory included in the toner cartridge 20.

The paper setter 93 is a user interface for setting a size and a type of sheets on which images are to be printed by the image-forming apparatus 100. In the image-forming apparatus 100, the user can operate the paper setter 93 to set a size and a type of sheets to be printed.

The communicator 94 establishes communication with the management server 200 and transmits and receives information to and from the management server 200.

The storage 30 is a readable and writable recording medium and is, for example, a solid state drive (SSD), a hard disk drive (HDD), or the like. When the controller 40 is a CPU, the storage 30 stores control programs and other programs to be executed by the CPU. Furthermore, the storage 30 also stores the control information 32 and test pattern information 33.

The control information 32 is set so as to correspond to the toner cartridge 20 installed in the mounting case 21 and is used to control the printer 110. Examples of the control information 32 required for the toner cartridge 20 include an adjustment value for color correction, a setting value of a transfer bias to be applied to the intermediate transfer rollers 64, a setting value of a fusing temperature set in the fusing unit 7, and a setting value of power of a laser beam emitted by the exposure unit 1.

Note that the examples of the control information 32 may include both default control information preset at a time of manufacture of the image-forming apparatus 100 and updated control information newly set for the toner cartridge 20 installed in the mounting case 21, or may include only the updated control information.

Furthermore, the examples of the control information 32 may include control information items for toner cartridges 20 that have been previously mounted in the mounting case 21. When the examples of the control information 32 include control information items for toner cartridges 20 that have been previously mounted, identification information indicating the toner cartridge 20 mounted on the mounting case 21 and the control information 32 corresponding to the toner cartridge 20 are stored in the storage 30 in association with each other.

Note that, in this specification, the control information 32 currently set in the image-forming apparatus 100 is referred to as preset control information where appropriate.

Examples of the test pattern information 33 include image data of a test pattern to be printed on a sheet to acquire the control information 32 and information about printing conditions for printing performed based on the image data of the test pattern. Examples of the test pattern to be printed on a sheet include a calibration patch shown in FIG. 3, a color correction patch shown in FIG. 4, a whole-area single color pattern shown in FIG. 5, a rectangular pattern shown in FIG. 6, a fine line pattern shown in FIG. 7, and a dot pattern shown in FIG. 8. FIGS. 3 to 8 are diagrams illustrating examples of a test pattern printed by the image-forming apparatus 100 according to the embodiment of the present disclosure.

Figure 3:
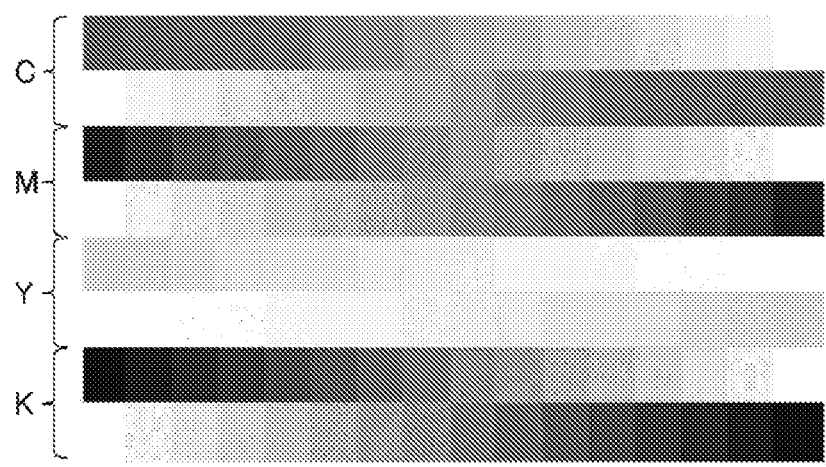
FIG. 3 is a diagram illustrating an example of a test pattern printed by the image-forming apparatus according to the embodiment of the present disclosure.

The calibration patch shown in FIG. 3 is an image of a pattern represented by patches of a plurality of gradation values for C, M, Y, and K from the top. That is, in FIG. 3, top two rows are patch rows for C, two rows below C are patch rows for M, two rows below M are patch rows for Y, and two rows below Y are patch rows for K. By reading an image of this calibration patch printed on a sheet, adjustment values for individually adjusting gradation for the single colors of C, M, Y, and K can be obtained as the control information 32.

Figure 4:
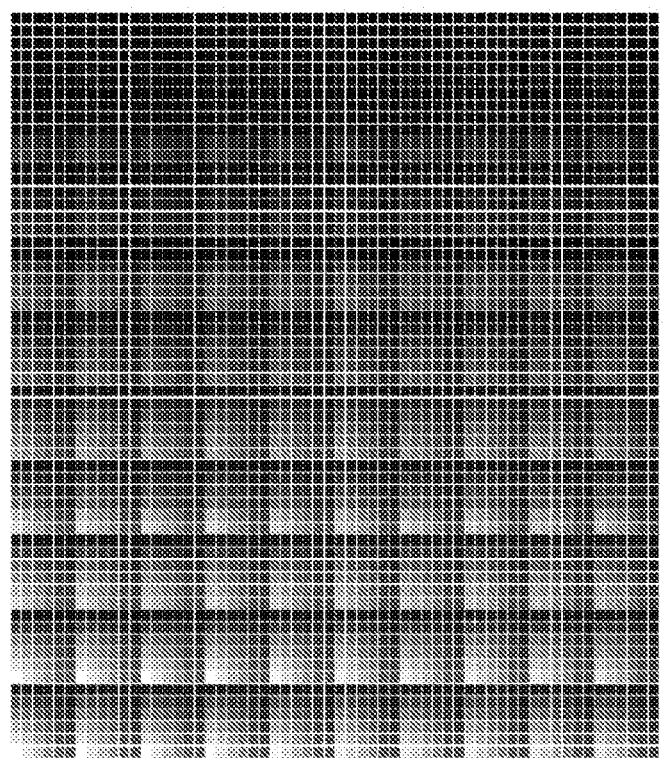
FIG. 4 is a diagram illustrating an example of a test pattern printed by the image-forming apparatus according to the embodiment of the present disclosure.

The color correction patch shown in FIG. 4 is an image showing a pattern of patches of C, M, Y, and K superposed one another with various gradation values. By reading an image of the color correction patch printed on a sheet, adjustment values for adjusting a color obtained by superposing the colors of C, M, Y, and K with the various gradations can be obtained as the control information 32.

Figure 5:
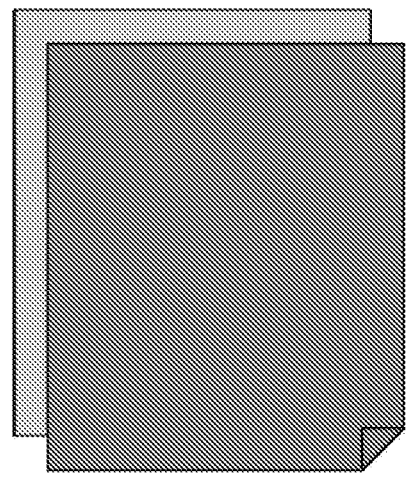
FIG. 5 is a diagram illustrating an example of a test pattern printed by the image-forming apparatus according to the embodiment of the present disclosure.

The whole-area single color pattern shown in FIG. 5 is an image printed in a single color over a whole area of a sheet. Color uniformity can be examined using the image printed on the sheet based on the whole-area single color pattern.

For example, the color uniformity obtained when a mesh area is 100% in mesh printing may be adjusted mainly by a setting value of the transfer bias to be applied to the intermediate transfer rollers 64 and a setting value of a fusing temperature of the fusing unit 7. Furthermore, uniformity of an intermediate gradation may be adjusted mainly by changing the setting value of the transfer bias to be applied to the intermediate transfer rollers 64 and a halftone pattern. Moreover, uniformity inhibition due to banding may be adjusted mainly by changing the halftone pattern. Therefore, by reading an image obtained by printing a whole-area single color pattern and extracting image information, the setting value of the transfer bias to be applied to the intermediate transfer rollers 64, the setting value of the fusing temperature of the fusing unit 7, and the halftone pattern may be obtained as the control information 32.

Figure 6:
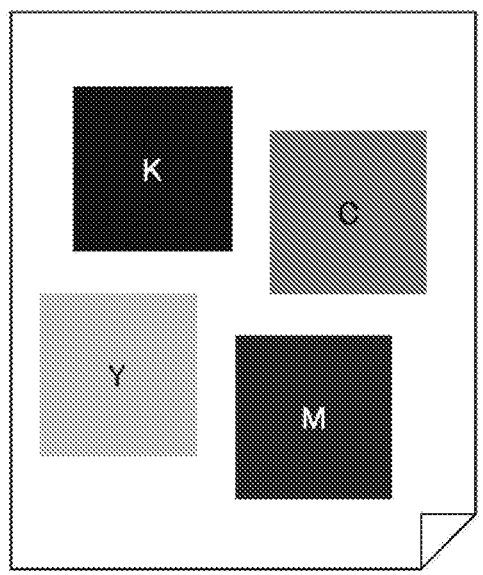
FIG. 6 is a diagram illustrating an example of a test pattern printed by the image-forming apparatus according to the embodiment of the present disclosure.

The rectangular pattern shown in FIG. 6 is an image obtained by printing rectangles of the individual colors C, M, Y, and K having a given gradation value. Using the image printed on a sheet based on the rectangular pattern, the presence or absence of a print lack can be examined. The print lack may be adjusted by the setting value of the transfer bias to be applied to the intermediate transfer rollers 64. Therefore, by reading the image obtained by printing the rectangular pattern and extracting image information, the setting value of the transfer bias to be applied to the intermediate transfer rollers 64 may be obtained as the control information 32.

Figure 7:
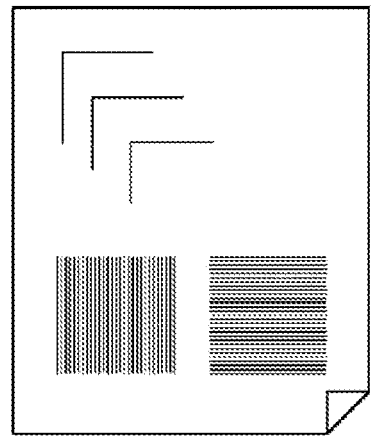
FIG. 7 is a diagram illustrating an example of a test pattern printed by the image-forming apparatus according to the embodiment of the present disclosure.

The fine line pattern shown in FIG. 7 is an image with a plurality of fine lines extending in a main scanning direction and a sub-scanning direction. Using the image printed on a sheet based on the fine line pattern, a determination as to whether line widths are changed may be made. The line widths may be adjusted by a magnitude of power of a laser beam emitted by the exposure unit 1. Therefore, by reading the image obtained by printing the fine line pattern and extracting image information, the setting value of the power of the laser beam to be emitted by the exposure unit 1 may be obtained as the control information 32.

Figure 8:
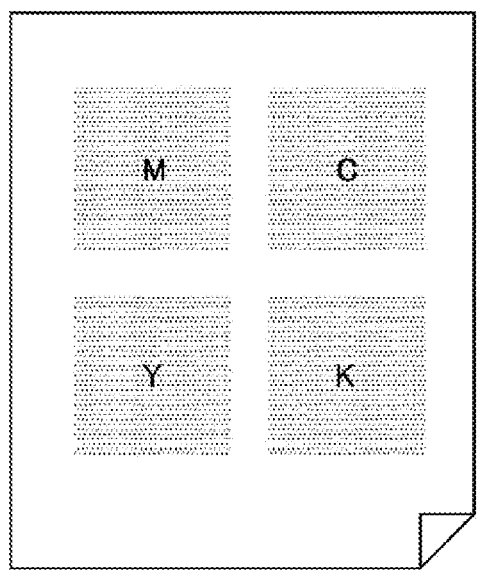
FIG. 8 is a diagram illustrating an example of a test pattern printed by the image-forming apparatus according to the embodiment of the present disclosure.

The dot pattern shown in FIG. 8 is a halftone image printed with dots (halftone dots) constituted by one or more than two pixels for each of C, M, Y, and K. Dot reproducibility about a dot shape, a dot size, and the like can be examined using the image printed on a sheet based on the dot pattern. The reproducibility of the dots can be improved by a screen (halftone dots) setting. Therefore, by reading the image obtained by printing the dot pattern and extracting image information, a type of screen to be selected may be obtained as the control information 32.

The controller 40 performs various controls on the various components included in the image-forming apparatus 100, and may be realized, for example, by a CPU. The controller 40 includes, as functional blocks, a determiner 41, an extractor 42, a control information acquirer 43, a paper information acquirer 44, and a test pattern acquirer 45. The functional blocks may be realized, in a case where the controller 40 is a CPU, when the CPU reads and executes a program, not shown, stored in the storage 30.

The determiner 41 determines whether the control information 32 for controlling the printer 110 that is set in accordance with the toner cartridge 20 mounted on the mounting case 21 exists. The process of determining whether the control information 32 exists that is performed by the determiner 41 will be described hereinafter in detail.

When determining that the control information 32 corresponding to the installed toner cartridge 20 does not exist, the determiner 41 instructs the printer 110 to print an image based on the test pattern information 33 on a sheet. In response to the instruction issued by the determiner 41, the printer 110 reads the test pattern information 33 from the storage 30 and prints an image based on the test pattern information 33 on a sheet.

Note that, the test pattern information 33 stored in the storage 30 may be information stored in advance in the storage 30 of the image-forming apparatus 100 or information obtained from the management server 200.

Furthermore, printing of an image based on the test pattern information 33 may be performed using control information currently set in the image-forming apparatus 100 (preset control information) or using default control information set in advance at the time of manufacture of the image-forming apparatus 100.

The extractor 42 extracts image information from the image of the test pattern printed on a sheet. Here, the image information extracted by the extractor 42 may be image data of the test pattern printed on the sheet itself or the pixel values of the test pattern printed on the sheet.

The control information acquirer 43 acquires the control information 32 generated based on the image information extracted by the extractor 42. Specifically, the control information acquirer 43 transmits the image information extracted by the extractor 42 to the management server 200 and requests generation of the control information 32. The control information acquirer 43 then acquires the control information 32 from the management server 200.

The paper information acquirer 44 acquires paper information, such as a paper size and a paper type of the sheet set in the image-forming apparatus 100. The paper information acquirer 44 can acquire paper information from information set by the user operating the paper setter 93. Furthermore, when the paper feeding cassette 81 includes a sensor for determining a paper size and a paper type, the paper information acquirer 44 may acquire paper information from the paper feeding cassette 81.

The paper information acquired by the paper information acquirer 44 is transmitted to the management server 200 together with the image information when the control information acquirer 43 requests the management server 200 to generate the control information 32.

The test pattern acquirer 45 acquires the test pattern information 33 when the printer 110 prints a test pattern image. The test pattern acquirer 45 can read and acquire the test pattern information 33 from the storage 30 when the test pattern information 33 is stored in advance in the storage 30. On the other hand, the test pattern acquirer 45 can acquire the test pattern information 33 from the management server 200 when the test pattern information 33 is not stored in the storage 30.

Management Server

The management server 200 manages the image-forming apparatus 100 connected to the management server 200 in a communicable manner. As shown in FIG. 1, the management server 200 includes a server controller 50, a server communicator 52, and a server storage 53.

The server controller 50 performs various controls on the various components included in the management server 200, and may be realized, for example, by a CPU. The server controller 50 includes the control information generator 51 as a functional block. The functional blocks may be realized, in a case where the server controller 50 is a CPU, when the CPU reads and executes a program, not shown, stored in the server storage 53.

The control information generator 51 generates the control information 32 based on image information and paper information received from the image-forming apparatus 100 via the server communicator 52. The control information generator 51 transmits the generated control information 32 to the image-forming apparatus 100 via the server communicator 52.

The server storage 53 is a readable/writable storage medium, and is, for example, an SSD or an HDD. When the server controller 50 is a CPU, the server storage 53 stores control programs and other programs to be executed by the CPU. The server storage 53 may also store test pattern information 33 to be supplied to the image-forming apparatus 100.

The server communicator 52 establishes communication with the image-forming apparatus 100 and transmits and receives information to and from the image-forming apparatus 100.

Control Information Acquisition Process

Figure 9:
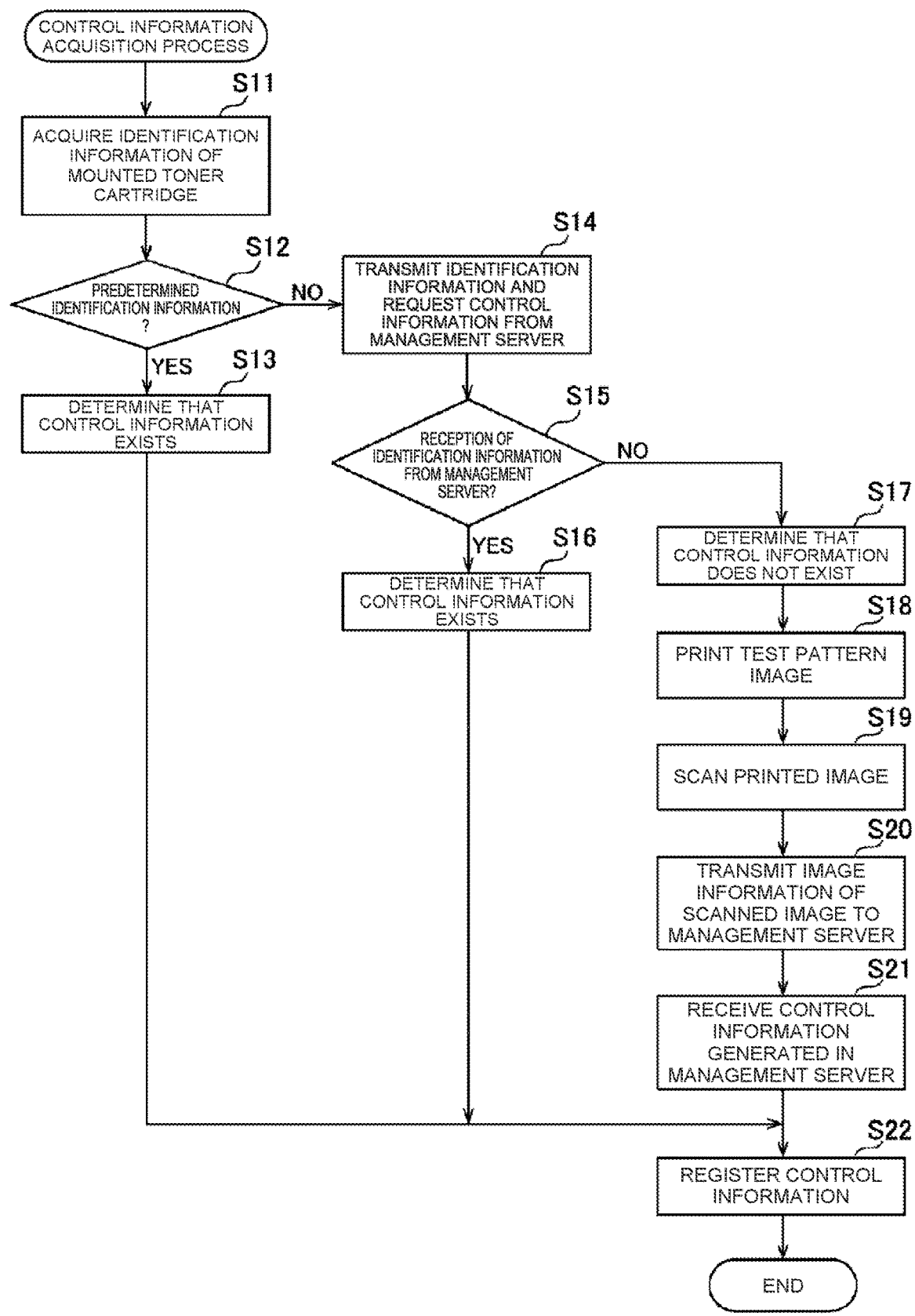
FIG. 9 is a flowchart of an example of a control information acquisition process performed by the image-forming apparatus according to the embodiment of the present disclosure.

Next, a control information acquisition process performed by the image-forming apparatus 100 according to the embodiment of the present disclosure will be described with reference to FIG. 9. FIG. 9 is a flowchart of an example of the control information acquisition process performed by the image-forming apparatus 100 according to the embodiment of the present disclosure.

First, when the toner cartridge 20 is mounted on the mounting case 21, the controller 40 acquires identification information from the toner cartridge 20 (step S11). Then, in the controller 40, the determiner 41 determines whether the acquired identification information is predetermined identification information (step S12). Here, the predetermined identification information is identification information that is stored in advance in the storage 30 in association with the control information 32. When the identification information has an expiration date, the predetermined identification information is information within the expiration date.

When the determiner 41 determines that the acquired identification information is the predetermined identification information ("YES" in step S12), the determiner 41 determines that control information 32 corresponding to the toner cartridge 20 mounted on the mounting case 21 exists (step S13). Then, the determiner 41 registers the control information 32 corresponding to the predetermined identification information stored in the storage 30 as information to be applied to control the printer 110 (step S22).

On the other hand, when the determiner 41 determines that the information is not the predetermined identification information ("NO" in step S12), the determiner 41 transmits the identification information of the toner cartridge 20 mounted on the mounting case 21 so as to request the control information 32 from the management server 200 (step S14).

When receiving the control information 32 corresponding to the identification information from the management server 200 ("YES" in step S15), the determiner 41 determines that control information corresponding to the toner cartridge 20 mounted on the mounting case 21 exists (step S16). Then, the determiner 41 registers the control information 32 received from the management server 200 as information to be applied to control the printer 110 (step S22).

On the other hand, when the control information 32 corresponding to the identification information is not received from the management server 200 ("NO" in step S15), the determiner 41 determines that control information 32 corresponding to the toner cartridge 20 mounted on the mounting case 21 does not exist (step S17). When the determiner 41 determines that the control information 32 does not exist, the test pattern acquirer 45 acquires the test pattern information 33 from the storage 30. Then, the printer 110 prints an image based on the test pattern information 33 acquired by the test pattern acquirer 45 on a sheet using the mounted toner cartridge 20 (step S18). That is, the printer 110 prints a test pattern image included in the test pattern information 33 based on information about printing conditions included in the test pattern information 33.

Subsequently, the image-forming apparatus 100 scans the image printed on the sheet in step S18 (step S19). The scanning of an image may be performed by the image reader 90 after the user places a sheet having a printed image on the document laying table 92. Alternatively, the scanning of an image may be performed on a sheet transported through the paper transport path S using an in-line sensor, not shown, disposed between the transport roller 12b in the paper transport path S and the paper discharge tray 91. When an image is scanned by the in-line sensor, an image of the test pattern automatically printed on a sheet can be scanned in the image-forming apparatus 100.

Thereafter, the extractor 42 extracts image information from image data of the test pattern obtained by the scanning. Then, the control information acquirer 43 transmits the image information extracted by the extractor 42 to the management server 200 and instructs generation of the control information 32 (step S20).

When the management server 200 receives the image information from the image-forming apparatus 100, the control information generator 51 generates the control information 32 based on the received image information. The control information generator 51 then transmits the generated control information 32 to the image-forming apparatus 100.

When the control information acquirer 43 in the image-forming apparatus 100 receives the control information 32 from the management server 200 (step S21), the received control information 32 is registered as information to be applied to control the printer 110 (step S22).

In this way, the image-forming apparatus 100 can obtain the control information 32 corresponding to the toner cartridge 20 mounted on the mounting case 21.

Note that, although the control information acquirer 43 instructs the generation of the control information 32 by transmitting the image information to the management server 200 in step S20, the control information acquirer 43 may transmit to the management server 200 paper information concerning a sheet having a printed image that is acquired by the paper information acquirer 44. When the configuration in which the paper information is transmitted to the management server 200 together with the image information is employed, the management server 200 can generate the control information 32 taking into account effects of a type of sheet having a printed image and other factors.

First Modification

Figure 10:
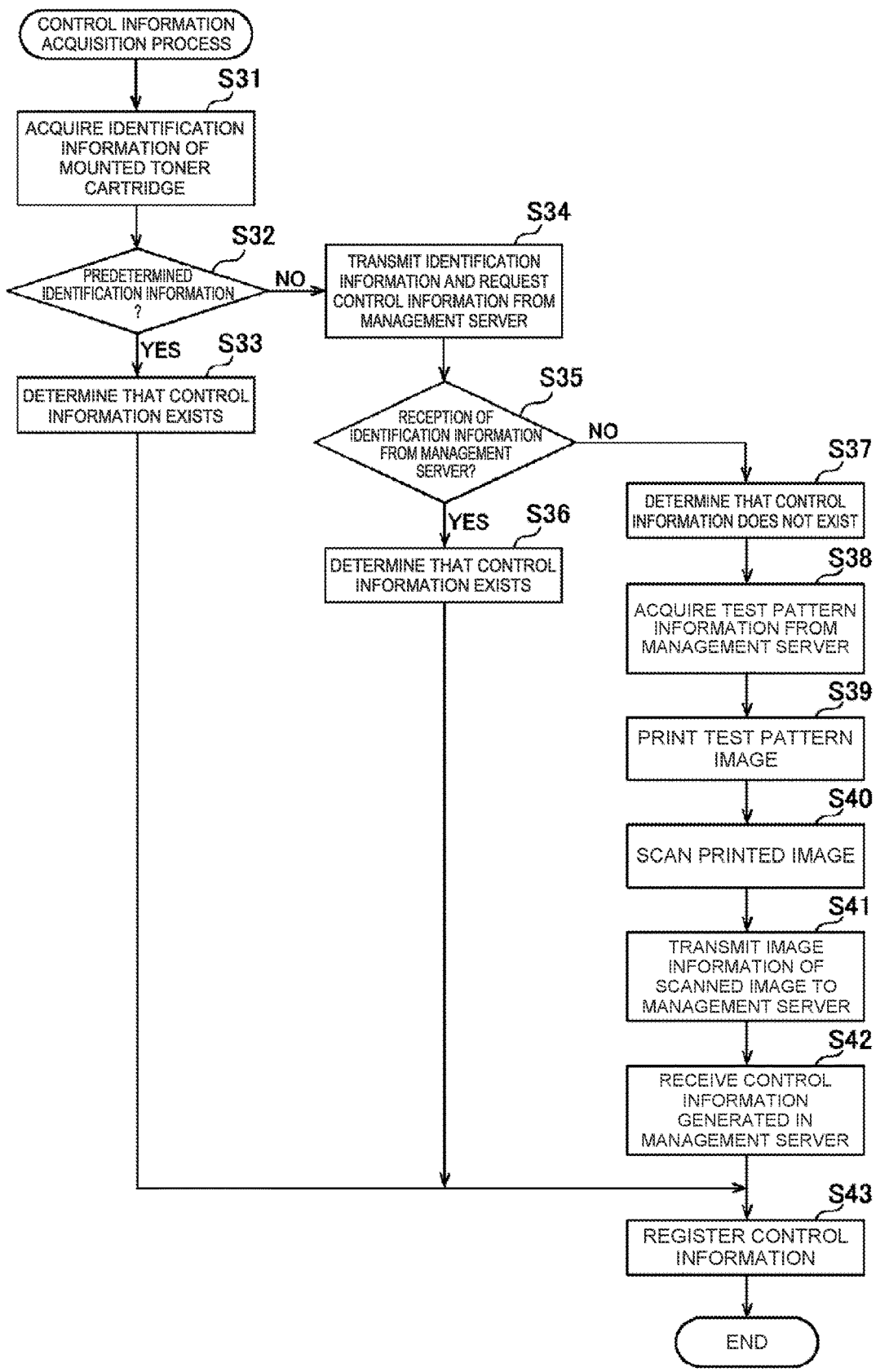
FIG. 10 is a flowchart of an example of a control information acquisition process performed by an image-forming apparatus according to a first modification of the embodiment of the present disclosure.

In the control information acquisition process performed by the image-forming apparatus 100 shown in FIG. 9, in step S18, the test pattern image is printed based on the test pattern information 33 stored in advance in the storage 30. However, the image-forming apparatus 100 may obtain the test pattern information 33 from the management server 200. In the following, the configuration for acquiring the test pattern information 33 from the management server 200 will be described with reference to FIG. 10 as a first modification. FIG. 10 is a flowchart of an example of a control information acquisition process performed by an image-forming apparatus 100 according to the first modification of the embodiment of the present disclosure.

In the image-forming apparatus 100 according to the first modification, when a toner cartridge 20 is mounted on a mounting case 21, a controller 40 acquires identification information from the toner cartridge 20 (step S31). From this point on, a process from step S32 to step S37 is the same as the process from step S12 to step S17 in FIG. 9, and therefore, a description thereof is omitted.

When a determiner 41 determines that control information 32 corresponding to the toner cartridge 20 mounted on the mounting case 21 does not exist in step S37, a test pattern acquirer 45 acquires test pattern information 33 from a management server 200 (step S38). In other words, the test pattern acquirer 45 requests the management server 200 to transmit the test pattern information 33. The management server 200 transmits the test pattern information 33 to the image-forming apparatus 100 in response to the request supplied from the test pattern acquirer 45. In this way, in the image-forming apparatus 100, the test pattern acquirer 45 acquires the test pattern information 33 from the management server 200.

Then, the printer 110 prints an image of a test pattern included in the test pattern information 33 acquired by the test pattern acquirer 45 based on information on print conditions included in the test pattern information 33 on a sheet using the mounted toner cartridge 20 (step S39). From this point on, a process from step S40 to step S43 is the same as the process from step S19 to step S22 in FIG. 9, and therefore, a description thereof is omitted.

Second Modification

In the control information acquisition process performed by the image-forming apparatus 100 shown in FIG. 9, the image information of the scanned image is transmitted to the management server 200 in step S20. Here, when the control information 32 corresponding to the toner cartridge 20 mounted on the mounting case 21 is generated from the beginning, a large number of types of test pattern image are required to be printed on a sheet. Therefore, an image-forming apparatus 100 according to the second modification of the embodiment of the present disclosure is configured such that the number of test pattern images required to be printed on a sheet can be reduced.

Figure 11:
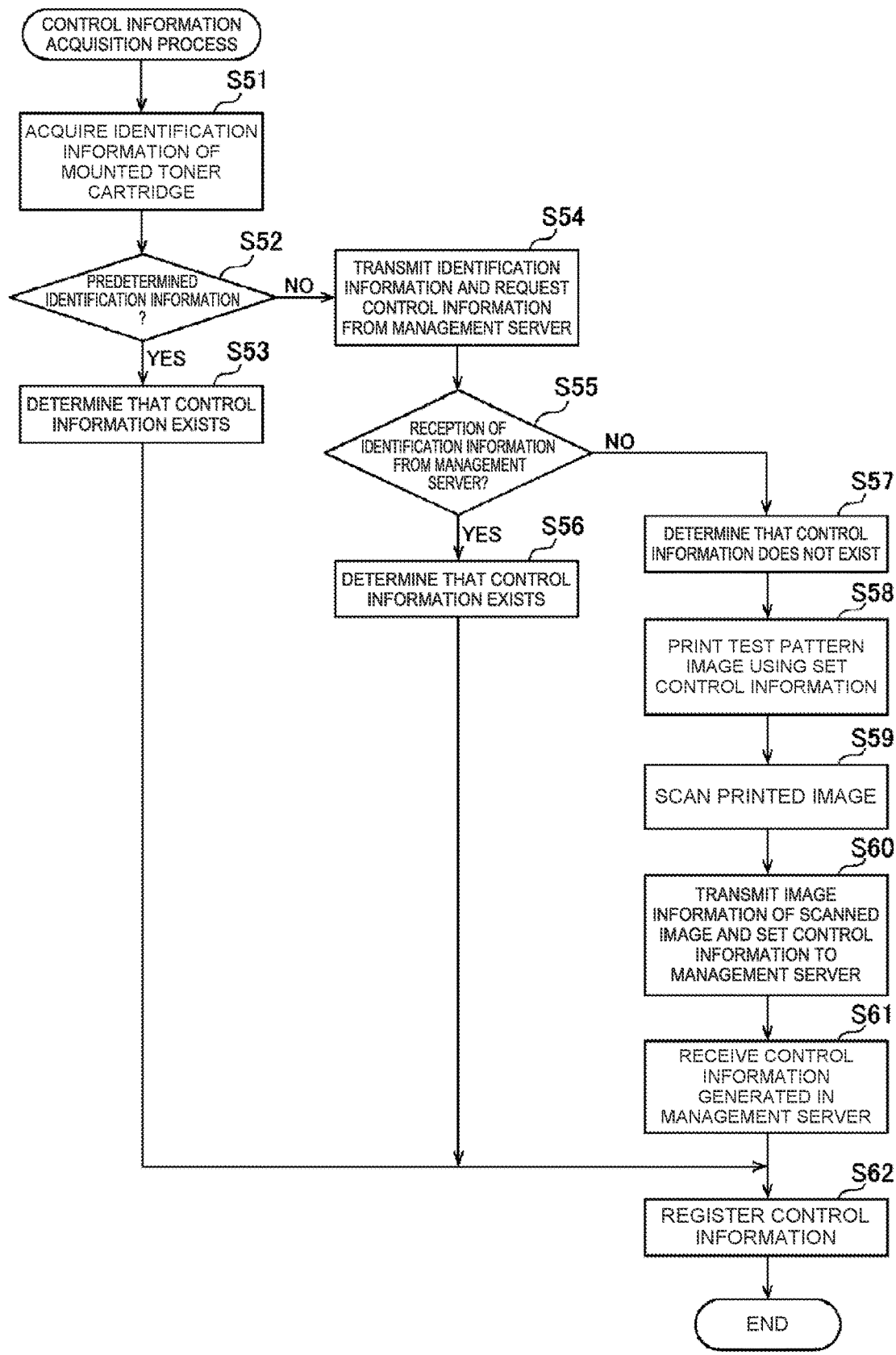
FIG. 11 is a flowchart of an example of a control information acquisition process performed by an image-forming apparatus according to a second modification of the embodiment of the present disclosure.

Hereinafter, a control information acquisition process performed by the image-forming apparatus 100 according to the second modification of the embodiment of the present disclosure will be described with reference to FIG. 11. FIG. 11 is a flowchart of an example of a control information acquisition process performed by the image-forming apparatus 100 according to the second modification of the embodiment of the present disclosure.

In the image-forming apparatus 100 according to the second modification, when a toner cartridge 20 is mounted on a mounting case 21, a controller 40 acquires identification information from the toner cartridge 20 (step S51). From this point on, a process from step S52 to step S57 is the same as the process from step S12 to step S17 in FIG. 9, and therefore, a description thereof is omitted.

When a determiner 41 determines that control information 32 corresponding to the toner cartridge 20 mounted on the mounting case 21 does not exist in step S57, a test pattern acquirer 45 acquires test pattern information 33. Then, the printer 110 prints an image based on the test pattern information 33 acquired by the test pattern acquirer 45 on a sheet using the mounted toner cartridge 20 based on preset control information (step S58).

Subsequently, in the image-forming apparatus 100 according to the second modification, an image reader 90 scans the image printed on the sheet in step S58 (step S59).

Then, an extractor 42 extracts image information from the scanned image data. Then, the control information acquirer 43 transmits the image information extracted by the extractor 42 and the preset control information to the management server 200 and instructs generation of the control information 32 corresponding to the mounted toner cartridge 20 (step S60).

When receiving the image information and the preset control information from the image-forming apparatus 100, a management server 200 generates control information 32 based on the image information and the preset control information received by a control information generator 51. The control information generator 51 then transmits the generated control information 32 to the image-forming apparatus 100.

When a control information acquirer 43 receives the control information 32 from the management server 200 (step S61), the received control information 32 is registered as information to be applied to a print process performed by the printer 110 (step S62).

As described above, the image-forming apparatus 100 according to the second modification prints a test pattern on a sheet using the preset control information stored in the storage 30 in advance. Accordingly, the number of test pattern images required to be printed on a sheet may be reduced. More specifically, when a color correction patch is to be generated as a test pattern and when each of C, M, Y, and K has 11 shades in 10% increments, 14641 color combinations (=11×11×11×11 colors) are required to cover all color combinations. Furthermore, when a test pattern is printed with 1 cm×1 cm patches for individual color combinations, an area of at least 14641 square centimeters is required to arrange all the patches. Thus, for example, when printing all the patches on a sheet of an A4 (29.7×21 cm) size, at least 31 sheets are required when the printable area excluding margins on the sheet is 27×18 cm.

Therefore, the image-forming apparatus 100 according to the second modification reduces the number of test pattern images to be printed using the preset control information. For example, in an ink generation process in which an image expressed in three colors of R, G, and B is converted into an image of C, M, and Y, and then into C, M, Y, and K by black ink generation, conversion information used in the black ink generation is stored in the storage 30 as the preset control information. Then, when a new toner cartridge 20 is set, an image expressed in the three colors of R, G, and B is color-converted to an image of C, M, and Y using the toner cartridge 20 after replacement, and the image is converted into an image of C, M, Y, and K by black ink generation using conversion information stored as the preset control information. In this way, when the black ink generation process is performs using the preset control information, the control information 32 to be generated by the management server 200 when the toner cartridge is replaced with a new toner cartridge 20 is the information for color conversion of an image expressed in the three colors R, G, and B to an appropriate image of C, M, and Y using the toner cartridge 20 after replacement. Therefore, it is only necessary to prepare patches of 1331 colors (11×11×11), which is a combination of R, G, and B, and accordingly, the number of test pattern images to be printed may be reduced.

As described above, the image-forming apparatus 100 is connected to the management server 200 via a network in a communicable manner to transmit and receive information. Here, when communication between the two is blocked and information may not be transmitted or received, information may be transmitted and received between the two via a portable external storage medium, such as a USB memory device. Alternatively, the image-forming apparatus 100 may establish communication with the management server 200 via an externally connected communication terminal to transmit and receive information.

Furthermore, in the image-forming apparatus 100, the image reader 90 or the in-line sensor may scan a test pattern image printed on a sheet. However, when an external scanner or a writing camera electrically connected to the image-forming apparatus 100 is provided, a test pattern image may be scanned by the external scanner or the writing camera.

Furthermore, in a print management system 300, the control information 32 is generated by the management server 200. However, the controller 40 of the image-forming apparatus 100 may further include a control information generator 51 included in the management server 200, and the control information 32 may be generated by the image-forming apparatus 100.

However, the management server 200 can acquire more information about the toner cartridge 20 than the image-forming apparatus 100. Therefore, the configuration in which the control information 32 is generated by the management server 200 is more suitable than the configuration in which the control information 32 is generated by the image-forming apparatus 100 in that an appropriate control information 32 can be generated.

Furthermore, although the toner cartridge 20 is taken as an example of a consumable that is detachable from the image-forming apparatus 100, the present disclosure is not limited to this. For example, when the image-forming apparatus 100 is an ink jet printer, the consumable may be an ink cartridge. Consumables can be any component that requires replacement due to execution of a print processes in the image-forming apparatus 100.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An image-forming apparatus, comprising:
   a consumable that is detachable;
   a printer that prints an image using the consumable; and
   a controller that determines whether control information, that is set for the consumable and for controlling the printer, exists, wherein
   the controller
      obtains identification information in association with the control information from the consumable,
      extracts, when the controller determines that the control information corresponding to the identification information does not exist, image information from an image of a predetermined test pattern printed by the printer, and
      acquires the control information, corresponding to the identification information, which is generated based on the extracted image information.

2. The image-forming apparatus according to claim 1, wherein the image-forming apparatus is connected, in a communicable manner, to a management server that manages the image-forming apparatus, and
   the controller transmits the extracted image information to the management server and acquires the control information generated based on the image information from the management server.

3. The image-forming apparatus according to claim 2, wherein
the controller further
acquires paper information of a sheet on which the image of the predetermined test pattern is printed by the printer, and
transmits the paper information together with the image information to the management server.

4. The image-forming apparatus according to claim 2, wherein
the controller further acquires, from the management server, test pattern information including the predetermined test pattern and a print condition for printing the predetermined test pattern, and
the printer prints the predetermined test pattern based on the acquired test pattern information.

5. The image-forming apparatus according to claim 2, further comprising:
a storage that stores preset control information that is the control information set in the image-forming apparatus, wherein
when the controller determines that the control information corresponding to the consumable does not exist,
the image information is extracted, from the image of the predetermined test pattern printed by the printer, based on the preset control information stored in the storage, and
the preset control information is transmitted to the management server together with the extracted image information, and the control information generated based on the image information and the preset control information is acquired from the management server.

6. The image-forming apparatus according to claim 5, wherein the controller stores the acquired preset control information and the identification information of the consumable that are associated with each other in the storage.

7. The image-forming apparatus according to claim 1, further comprising:
a transport path that transports a sheet on which the image of the predetermined test pattern is printed by the printer; and
an image reader that reads the image of the predetermined test pattern from the sheet that passes the transport path, wherein
the controller extracts the image information from the image of the predetermined test pattern read by the image reader.

8. A print management system, comprising:
the image-forming apparatus according to claim 1, and
a management server that generates the control information generated based on the image information extracted by the image-forming apparatus.

9. A method for controlling an image-forming apparatus that includes a printer that prints an image using a consumable that is detachable, the method comprising:
determining whether control information that is set for the consumable and for controlling the printer exists;
obtaining identification information in association with the control information from the consumable;
extracting, when the control information corresponding to the identification information is determined not to exist, image information from an image of a predetermined test pattern printed by the printer; and
acquiring the control information corresponding to the identification information which is generated based on the extracted image information.

10. The image-forming apparatus according to claim 1, wherein,
when the identification information has an expiration date, the identification information is information within the expiration date.

11. The method for controlling an image-forming apparatus according to claim 9, wherein,
when the identification information has an expiration date, the identification information is information within the expiration date.

* * * * *